W. CHADWICK.
UNIVERSAL JOINT.
APPLICATION FILED FEB. 19, 1913.

1,111,645.   Patented Sept. 22, 1914.

Witnesses
R. N. Jones.
C. R. Bealle.

Inventor
Wallace Chadwick
By T. Randolph Jr.
Attorney

UNITED STATES PATENT OFFICE.

WALLACE CHADWICK, OF SCHENECTADY, NEW YORK.

UNIVERSAL JOINT.

1,111,645.      Specification of Letters Patent.      Patented Sept. 22, 1914.

Application filed February 19, 1913. Serial No. 749,469.

*To all whom it may concern:*

Be it known that I, WALLACE CHADWICK, a citizen of the United States, residing at Schenectady, in the county of Schenectady and State of New York, have invented certain new and useful Improvements in Universal Joints; and I do hereby declare the following to be a full, clear, and exact description of the invention, such as will enable others skilled in the art to which it appertains to make and use the same.

This invention relates to universal joints and one of the principal objects of the invention is to provide a joint in which the two members of the shaft may be moved in any direction angularly from a direct line through said members.

Another object of the invention is to provide a ball and socket joint for permitting the angular movement of one member of a shaft relatively to the other and to always insure rotation of both members in the same direction.

Still another object of the invention is to provide a universal joint in which the socket member is provided with a rectangular socket and the ball member is provided with a central bearing portion which is curved longitudinally of the shaft and is rectangular when viewed in plan or in alinement with the shaft, so that the ball member will move angularly or at various inclinations from the socket and insure the rotation of both members, owing to the formation of the socket and the angular contour of the ball member when viewed in alinement with the shaft.

Figure 1:
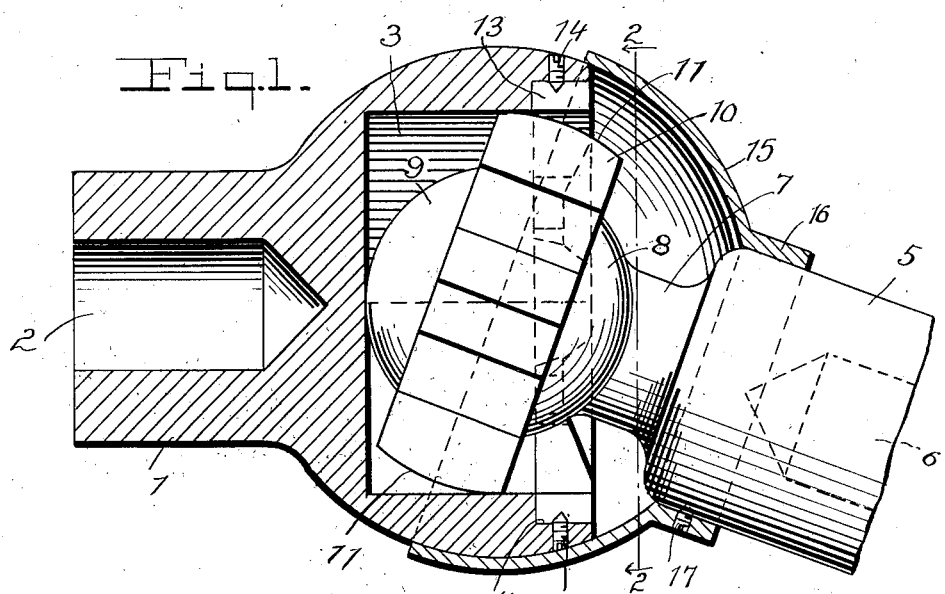
Figure 2:
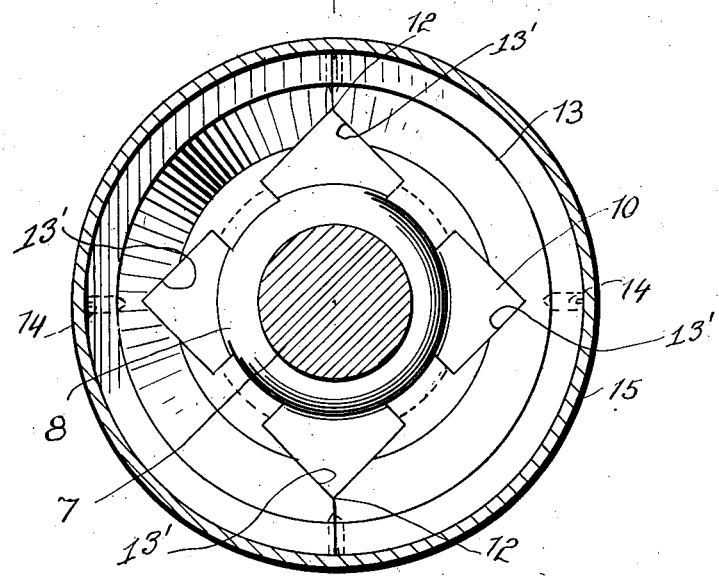
Figure 3:
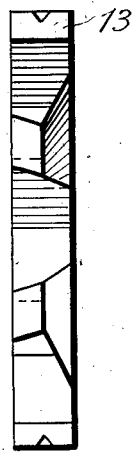
Figure 4:
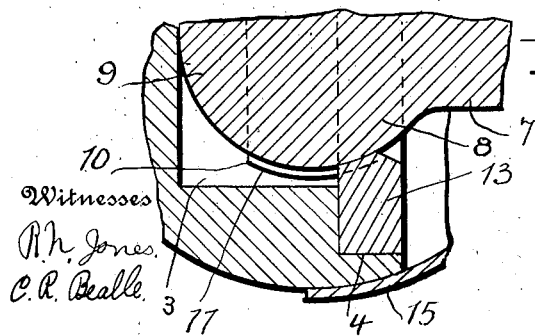

These and other objects may be attained by means of the construction illustrated in the accompanying drawing in which:

Figure 1 is a side elevation and partial section of a universal joint made in accordance with my invention. Fig. 2 is a vertical sectional view taken on the line 2—2 of Fig. 1, looking in the direction indicated by the arrow. Fig. 3 is a sectional view of the split ring for holding the ball member in the socket. Fig. 4 is a partial longitudinal detail view showing the parts in section.

Referring to the drawing, the numeral 1 designates the shank of the socket member provided with a bore or bearing 2 for a shaft. A rectangular socket 3 is formed in this member, and an annular recess 4 surrounds the socket near the outer end thereof.

The ball member of the joint comprises a shank 5, having a bore or bearing 6 for a shaft and a head comprising a reduced portion 7 and rounded parts 8 and 9. Intermediate the portions 8 and 9 is a bearing element 10 provided with curved surfaces 11 which extend across the element from side to side and from top to bottom. These four curved surfaces 11 at their greatest diameters represent the internal cross section of the socket 3. The corners of the member 10 are curved on the same radii as the surface 11. These corners are indicated by the numeral 12. For holding the ball member in the socket I provide a split ring 13 which fits within the annular recess 4 and is held in place by small screws 14. The split ring 13 is provided with a plurality of angular recesses 13' opening on the inner edge of the ring and conforming to the shape generally, of the curved surfaces 11. The recesses are approximately V-shaped and adapted to receive the bearing element 10.

A dust cap 15 is provided with a collar 16 connected to the shank 5 by a screw 17, said dust cap projecting over the socket member to entirely inclose the opening therein.

From the foregoing it will be obvious that a universal joint made in accordance with my invention will permit the angular movement of one member of the shaft and at the same time insure the rotation of both members in the same direction, owing to the fact that the socket member is square and the ball member is longitudinally curved and transversely square.

My invention is simple in construction, can be manufactured at low cost, is easy to install, can be readily assembled and is strong, durable and efficient for its purpose.

I claim:—

In a universal joint, a socket member having a rectangular socket provided with an annular recess adjacent the outer edge thereof, a ball member provided with rounded portions, the inner rounded portion of which is adapted to engage the flat bottom wall of the socket, the ball member being provided with bearing elements formed centrally and intermediate the ends of said rounded portions and adapted to engage the side walls of the socket, the greatest diameter of the bearing elements being equal to the internal cross section of the socket, said bearing elements having their bearing surfaces longitudinally curved and ending short of the ends of said rounded portions, and a split ring mounted within said annular recess, lying flush with the outer edge thereof and having certain portions thereof engaging the upper rounded portion above the bearing elements to hold said ball member within said socket, said split ring being provided with a plurality of V-shaped recesses upon its face adapted to receive the bearing elements.

In testimony whereof I affix my signature in presence of two witnesses.

WALLACE CHADWICK.

Witnesses:
 HARRY A. BAINES,
 MARTIN SITTS,